United States Patent
Kraut

(10) Patent No.: US 8,085,892 B2
(45) Date of Patent: Dec. 27, 2011

(54) OFFSET DETERMINATION ARRANGEMENT, OFFSET COMPENSATION ARRANGEMENT, SYNCHRONIZATION CLOCK GENERATOR, METHOD FOR DETERMINATION OF AN OFFSET AND MODULATION METHOD

(75) Inventor: Gunther Kraut, Egmating (DE)

(73) Assignee: Infineon Technologies AG, Neubiberg (DE)

( * ) Notice: Subject to any disclaimer, the term of this patent is extended or adjusted under 35 U.S.C. 154(b) by 1254 days.

(21) Appl. No.: 11/588,609

(22) Filed: Oct. 27, 2006

(65) Prior Publication Data

US 2008/0102775 A1 May 1, 2008

(51) Int. Cl.
*H03D 3/24* (2006.01)
(52) U.S. Cl. ......... 375/373; 375/364; 375/365; 375/371
(58) Field of Classification Search .................. 375/373, 375/364, 365, 366, 371
See application file for complete search history.

(56) References Cited

U.S. PATENT DOCUMENTS

| | | | |
|---|---|---|---|
| 5,450,137 A * | 9/1995 | Rickard et al. | 348/537 |
| 6,359,949 B1 * | 3/2002 | Okada et al. | 375/376 |
| 7,557,661 B1 * | 7/2009 | Melanson et al. | 331/1 A |
| 2006/0089111 A1 * | 4/2006 | Mayer et al. | 455/126 |

FOREIGN PATENT DOCUMENTS

| | | |
|---|---|---|
| DE | 4109490 C1 | 6/1992 |
| WO | WO 2006/060975 A1 | 6/2006 |

* cited by examiner

*Primary Examiner* — Kabir A Timory
(74) *Attorney, Agent, or Firm* — Eschweiler & Associates, LLC

(57) ABSTRACT

An offset determination arrangement includes a comparator device to compare an input signal with a reference value. A synchronization unit is provided to forward a comparison result of the comparator device as a function of a synchronization signal which can be generated by a synchronization clock generator. The synchronization signal includes clock pulses in which at least one clock period between adjacent clock pulses is shorter than a precedent clock period. The offset determination arrangement further includes an approximation unit to generate a compensation signal corresponding to an offset of the input signal as a function of the forwarded comparison result.

17 Claims, 3 Drawing Sheets

OFFSET DETERMINATION ARRANGEMENT, OFFSET COMPENSATION ARRANGEMENT, SYNCHRONIZATION CLOCK GENERATOR, METHOD FOR DETERMINATION OF AN OFFSET AND MODULATION METHOD

FIELD OF THE INVENTION

The present invention is directed to circuitry and more particularly to an apparatus and method of determining and compensating for a signal offset.

BACKGROUND OF THE INVENTION

The requirements for the signal quality of modulators, for example in transmitting devices, become more stringent as the need for high data rates and increasing mobility grows. The modern mobile radio standards, such as universal mobile telecommunication system (UMTS), wideband code division multiple access (WCDMA), global system for mobile communication (GSM), enhanced data rates for GSM evolution (EDGE), Bluetooth medium data rate or wireless local area network (WLAN) according to 802.11a/b/g require special modulation types for data transmission which modulate both the phase and the amplitude of a carrier signal at the same time.

Simultaneous amplitude and phase modulation make it possible to achieve higher data transmission rates and thus better bandwidth efficiency. The mobile radio standards mentioned above envisage, for example, the use of quadrature phase shift keying (QPSK), eight phase shift keying (8-PSK), or quadrature amplitude modulation (QAM) as modulation types for the data transmission.

Depending on the selected application for the individual mobile radio standards, these high-quality modulation types are used not only for data transmission from a base station to a mobile communication appliance but also from the mobile communication appliance to the base station.

The modulation types which are used for modern mobile radio standards are particularly sensitive to possible interference or distortion which is produced by various components in a transmission path. The modulation can be performed using a vector modulation in which data to be transmitted are provided with an in-phase component and a quadrature component which form a complex signal. In other systems, also a polar modulator can be used in which the data are coded as polar coordinates with an amplitude component and a phase component. The amplitude component is digital/analog converted and used for an amplitude modulation of a carrier signal which comprises the phase information of the phase component. Although the binary data of the phase component usually comprise an equal distribution of ones and zeros, it is possible that a permanent DC offset is generated, for example, in a digital/analog conversion step. When modulating the carrier signal with the analog amplitude signal having a DC offset the signal quality of the modulated signal can be impaired.

It is possible to determine the offset generated between the digital/analog converter and the amplitude modulator in a transmission path and to generate a signal to compensate for the offset. To this end, a compensation signal is adapted over several steps until the offset in the analog signal is compensated. Because of transient effects of the amplitude signal between the digital/analog converter and the amplitude modulator, a constant time between adjustment steps is chosen sufficiently long. This can lead to problems for time critical applications because of the duration of the approximation process.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

In one embodiment, an offset determination arrangement is disclosed and comprises a comparator device configured to compare an input signal with a reference value, and a synchronization unit configured to forward a comparison result of the comparator device as a function of a synchronization signal. The arrangement further comprises a synchronization clock generator configured to generate the synchronization signal, wherein the synchronization signal comprises clock pulses, and wherein at least one subsequent clock period is shorter than a precedent clock period. In addition, the arrangement comprises an approximation unit configured to generate a compensation signal corresponding to an offset of the input signal as a function of the forwarded comparison result.

In another embodiment of the invention, a method for determination of an offset is disclosed, and comprises providing a compensation signal, comparing an input signal depending on the compensation signal with a reference value, and generating a synchronization signal having pulses. At least one time period between adjacent pulses is shorter than a precedent time period. The method further comprises forwarding the comparison result as a function of the synchronization signal, and adjusting the compensation signal based on the forwarded comparison result.

To the accomplishment of the foregoing and related ends, the following description and annexed drawings set forth in detail certain illustrative aspects and implementations of the invention. These are indicative of but a few of the various ways in which one or more aspects of the present invention may be employed. Other aspects, advantages and novel features of the invention will become apparent from the following detailed description of the invention when considered in conjunction with the annexed drawings.

BRIEF DESCRIPTION OF THE DRAWINGS

The invention is explained in detail below using exemplary embodiments with reference to the drawings in which.

DETAILED DESCRIPTION OF THE INVENTION

Figure 1:
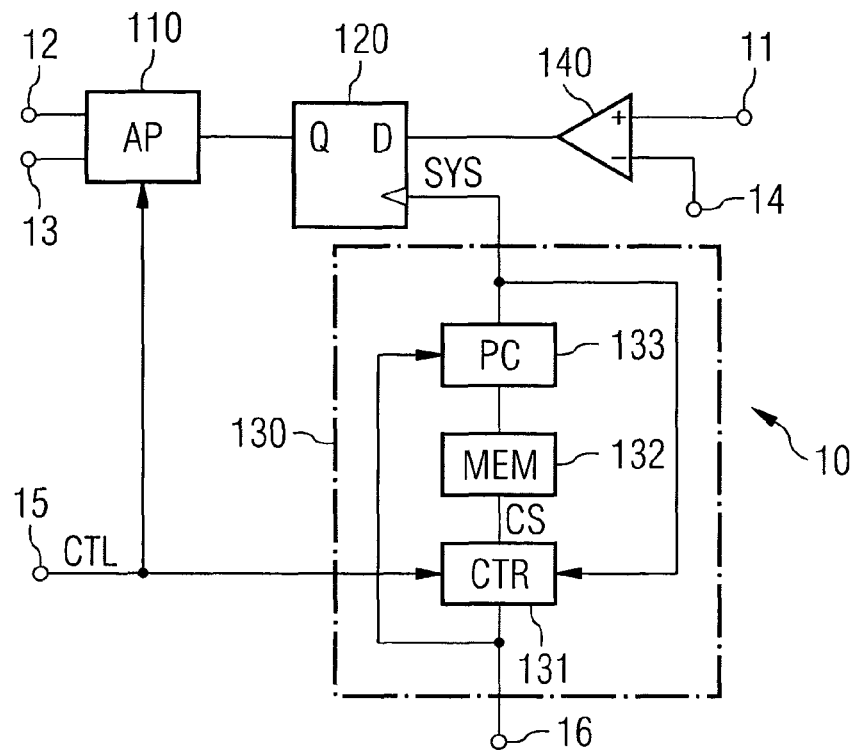
FIG. 1 is an exemplary embodiment of an offset determination arrangement.

In the following description further aspects and embodiments of the present invention are disclosed. In addition, reference is made to the accompanying drawings, which form a part thereof, and in which is shown by way of illustration, in which the invention may be practiced. The embodiments herein provide a better understanding of one or more aspects of the present invention. This disclosure of the invention is not intended to limit the features or key-elements of the invention to a specific embodiment. Rather, the different elements, aspects and features disclosed in the embodiments can be combined in different ways by a person skilled in the art to achieve one or more advantages of the present invention. It is to be understood that other embodiments may be utilized and structural or logical changes may be made without departing from the scope of the present invention. The elements of the drawing are not necessarily to scale relative to each other. Like reference numerals designate corresponding similar parts.

FIG. 1 shows an exemplary embodiment of an offset determination arrangement 10 which comprises a comparator device 140, a synchronization unit 120, an approximation unit 110 and a synchronization clock generator 130. The comparator device 140 comprises a non-inverting input (+) which is coupled to a signal input 11 to receive an input signal. It further comprises an inverting input (−) which is coupled to a reference input 14 to receive a reference value which can be, for example, a ground potential or a common mode voltage. The output of the comparator device 140 is coupled to a data input D of the synchronization unit 120. A synchronization signal SYS is provided to a clock input of the synchronization unit 120 by the synchronization block generator 130.

An output Q of the synchronization unit 120 is coupled to the approximation unit 110 which further comprises a signal output 12 and a control output 13.

The synchronization clock generator 130 comprises a control unit 131, a memory unit 132, and a programmable counter 133. The control unit 131 is coupled to a reference clock input 16 to receive a reference clock signal CLK which is also provided to the programmable counter 133. The control unit 131 is further coupled to the output of the programmable counter 133 to receive the synchronization signal SYS and to a control input 15 to receive a control signal CTL corresponding to a beginning of an offset determination.

To determine an offset or a DC offset of the input signal provided at the signal input 11, the input signal is compared to the reference value using the comparator device 140. The comparison result is provided to the synchronization unit 120 which in this embodiment comprises a D-flip-flop clocked with the synchronization signal SYS. The synchronization signal SYS comprises clock pulses depending on which the synchronization unit 120 forwards the comparison result to the approximation unit 110. With the information from the comparison result, the approximation unit 110 generates or adjusts a compensation signal corresponding to an offset of the input signal. The compensation signal is approximated over several steps, wherein each step corresponds to a clock pulse of the synchronization signal SYS. For example, a method of successive approximation can be used.

The beginning of the approximation, in other words the generation of an initial compensation signal, depends on the control signal CTL which, for example, can comprise an initial pulse signal.

The synchronization clock generator 130 generates the synchronization signal SYS, wherein at least one clock period between adjacent clock pulses is shorter than a precedent clock period. To this end, the control unit 131, which is triggered by the control signal CTL, in one embodiment generates a counter signal CS comprising a first counter value and provides it to the memory unit 132. In the memory unit 132 delay times are stored which can be addressed by respective counter values of the counter signal CS, wherein at least one delay time corresponding to one of the counter values is shorter than a delay time corresponding to a respective precedent counter value.

The read out delay times are provided to the programmable counter 133, which, in one embodiment, counts a number of clock pulses of the reference clock signal CLK, wherein the number of clock pulses corresponds to the provided delay time. If the desired number of clock pulses of the reference clock signal CLK is achieved, a clock pulse is generated in the synchronization signal SYS. The synchronization signal SYS can be provided to the control unit 131 to indicate an instant for changing or increasing the counter value of the counter signal CS. According to the previous explanation, in one embodiment a new delay time is read from the memory unit 132 and provided to the programmable counter 133.

In one embodiment, each of the counter values in the counter signal CS corresponds to one of a predetermined number of approximation steps to be performed in the approximation unit 110. In other words, the synchronization clock generator 130 generates the synchronization signal SYS with a predetermined number of clock pulses or clock periods. For example the synchronization signal SYS comprises a first clock period and a plurality of subsequent clock periods. In one embodiment each of the subsequent clock periods is shorter than a precedent clock period.

Figure 2:
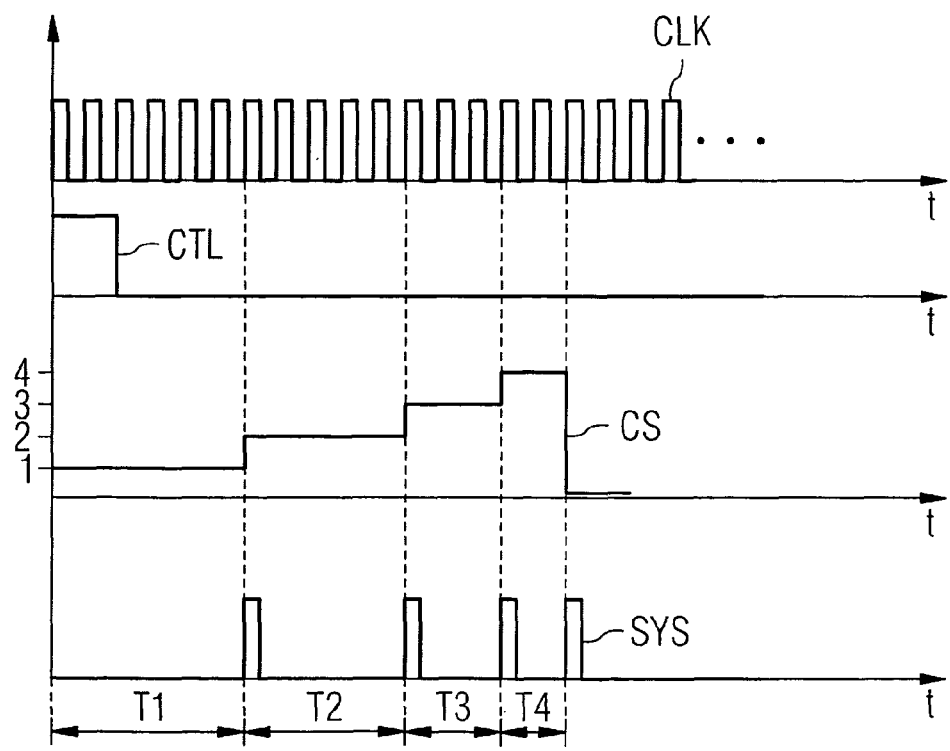
FIG. 2 is an exemplary diagram of signals used within an embodiment of an offset determination arrangement.

FIG. 2 shows an exemplary diagram of signals used within an embodiment of an offset determination arrangement, for example as shown in FIG. 1. The uppermost signal shown is the reference clock signal CLK having clock pulses with an equal distance or clock period. The signals shown are used for a successive approximation with four approximation steps. The approximation starts with a pulse of the control signal CTL. At this time, the approximation unit 110 provides the initial compensation signal at the output 12, for example. The control unit 131 generates the counter signal with a counter value of 1, in response to which a delay time is read out from the memory unit 132 and provided to the programmable counter 133. The programmable counter 133 generates a clock pulse in the synchronization signal SYS depending on the read out delay time, for example after seven clock pulses of the reference clock signal. The first clock pulse of the synchronization signal SYS also determines the first clock period T1.

With the clock pulse of the synchronization signal SYS, also the counter value of the counter value CS is increased to 2, resulting in a new delay time provided to the programmable counter 133 which in this example generates a next clock pulse of the synchronization signal SYS after five clock pulses of the reference clock signal CLK. The second clock period T2 between the first and the second clock pulse of the synchronization signal SYS is therefore shorter than the first clock period T1. The counter value of the counter signal CS is further increased in the following clock periods T3, T4, wherein the clock period T3 is shorter than the clock period T2 and the clock period T4 is shorter than the clock period T3. In other words, the synchronization signal SYS is generated in such a way that each of a second and further clock periods between adjacent clock pulses is shorter than a precedent clock period. This also results in periods between approximation steps in the approximation unit 110 being shorter than precedent periods. The number of clock pulses in the synchronization signal SYS or the number of approximation steps, respectively, can be predetermined within the control unit 131 or the synchronization clock generator 130, respectively.

Figure 3:
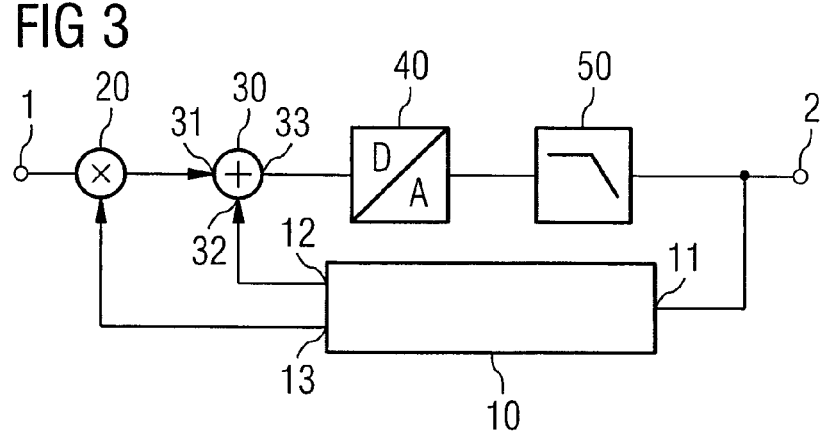
FIG. 3 is an exemplary embodiment of an offset compensation arrangement.

FIG. 3 shows an exemplary embodiment of an offset compensation arrangement. It comprises a signal input 1, a switching element 20 coupled to the signal input 1, and a summation element 30 with a first input 31 which is coupled to the switching element 20. A second input 32 of the summation element 30 is coupled to the signal output 12 of the offset determination arrangement 10, which in one embodiment is the arrangement of FIG. 1. The switching element 20 is controlled by a signal provided at the control output 13 of the offset determination arrangement 10.

A forward path of the offset compensation arrangement comprises a digital/analog converter 40 and a low-pass filter 50 and is coupled to an output 33 of the summation element 30. The offset determination arrangement 10 is comprised by a feedback path of which a signal input 11 is coupled to an output of the forward path or the output 2 of the offset compensation arrangement.

The offset determination arrangement 10 generates a compensation signal corresponding to an offset of an input signal at the output of the forward path, wherein the offset determination arrangement 10 uses a method of successive approximation in which at least one period between approximation steps is shorter than a preceding period between approximation steps. For example, the embodiment of the offset determination arrangement 10 shown in FIG. 1 can be used within the embodiment of FIG. 3.

When a compensation signal has already been determined, a digital signal, for example an amplitude word, can be provided at the signal input 1. In this case the switching element is in a closed state, controlled by the offset determination arrangement 10. The compensation signal, which is also provided in digital form, is added to the digital input signal to compensate for an offset of the digital/analog converter 40 and the low-pass filter 50. The resulting digital signal from the summation element 30 is then converted to an analog signal, filtered with a low-pass filter 50 and provided at the signal output 2.

An offset of the arrangement shown can, in one embodiment, be determined at times when no digital input signal is provided. As the arrangement can be used in a transmission path of a mobile communication terminal, in one embodiment, determination of the offset can be performed during transmission pauses, for example before transmitting of a signal frame in the GSM standard.

In one embodiment, an offset is determined by detecting a quiescent signal level which is obtained at the output of the forward path when no digital input signal is applied at signal input 1. To this end, the switching element 20 is switched to an open state, which results in no signal or a zero signal being present at the first input 31 of the summation element 30. Usually, a zero value is also chosen for an initial value of the compensation signal. The resulting value at the output 33 of the summation element 30 will be converted to an analog signal and filtered by the low-pass filter 50. Because of transient effects of the filtering of the analog signal, in one embodiment it takes a specific time until a stable filter output can be achieved, wherein the time depends on the transfer characteristic of the filter 50.

In a first approximation step, corresponding to the first clock pulse of the synchronization signal SYS, it can be determined whether an offset of the forward path is positive or negative, depending on the comparison result provided by the comparator device 140. Accordingly, a respective sign of the compensation signal can be chosen by the approximation unit 110 for the following approximation steps. When using successive approximation, according to one embodiment, the digital compensation signal is adjusted bitwise, for example starting with the most significant bit (MSB) of the compensation signal. A word length of the digital input signal at the signal input 1 and the digital compensation signal can be equal. In an alternative embodiment, the word length of the digital compensation signal is smaller than the word length of the digital input signal.

A change of the digital compensation signal results in one embodiment in a voltage step at the output of the digital/analog converter 40. The voltage step is filtered with the low-pass filter 50 which comprises a specific transient characteristic.

Figure 4:
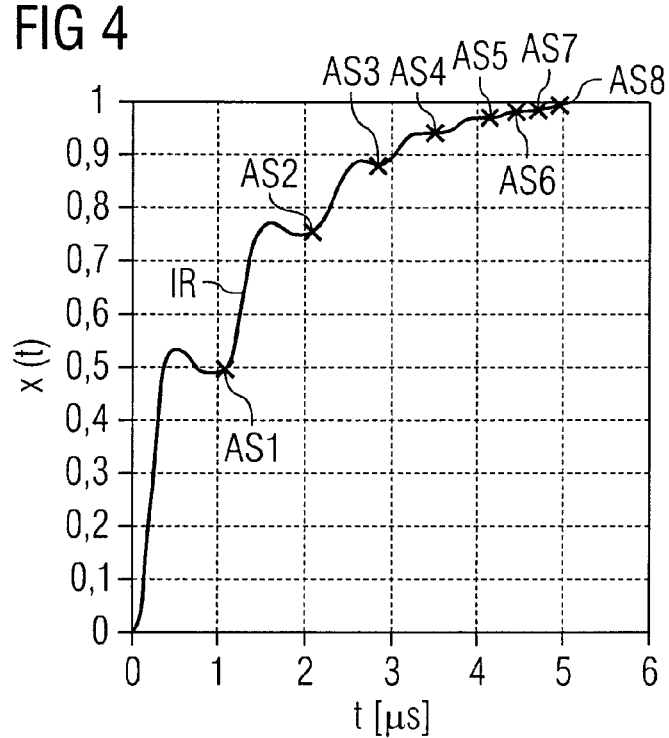
FIG. 4 is an exemplary diagram of a transient curve of a filter in an embodiment of an offset compensation arrangement.

FIG. 4 shows an exemplary transient curve IR of a third order Butterworth filter with a cut-off frequency of 1.5 MHz in an exemplary successive approximation process which can be used for the low-pass filter 50. The transient curve IR is normalized to a maximum value of 1.

In one embodiment of the approximation, the compensation signal is determined by setting the MSB to a logical value of 1 which results in a largest possible voltage step at the output of the digital/analog converter 40, for example corresponding to an analog value of 0.5. A second bit of the compensation signal can be set to a logical 1 in a second step of the approximation which, for example, corresponds to an analog value of 0.25. In the graph of FIG. 4, time instants for approximation steps AS1 to AS8 are indicated by crosses. In this example, a successive approximation is performed in eight approximation steps. A first approximation step AS1 is performed at a time of t=1.1 µs for x(t)=0.5, wherein x(t) represents the transient signal x as a function of time t. The second approximation step AS2 is performed at a time of t=2.1 us for x(t)=0.75. At a time of t=2.8 µs, the third approximation step AS3 is performed for x(t)=0.875. As one can see also from the following approximation steps AS4 to AS8, the times $t_n$ are determined such that $$x(t_n) = \frac{2^n - 1}{2^n}$$

where n is the number of the approximation step. This corresponds to a significance of the individual bits of the digital compensation signal.

The times $t_n$ can be determined analytically or by a numeric analysis of the respective filter characteristic. In one embodiment, the delay times stored in the memory unit 132 of the synchronization clock generator 130 can be derived from the determined times $t_n$.

It can also be seen from FIG. 4 that the distances between approximation steps become smaller for later approximation steps, resulting in shorter clock periods between later approximation compared to clock periods of earlier approximation steps.

For the example shown in FIG. 4, a total approximation time results in about 5 µs, compared to about 9 µs when always using the same delay time of the first approximation step AS1 in a conventional approximation method. Accordingly, an approximation time for determining a compensation signal to compensate an offset of an arrangement can nearly be halved.

Figure 5:
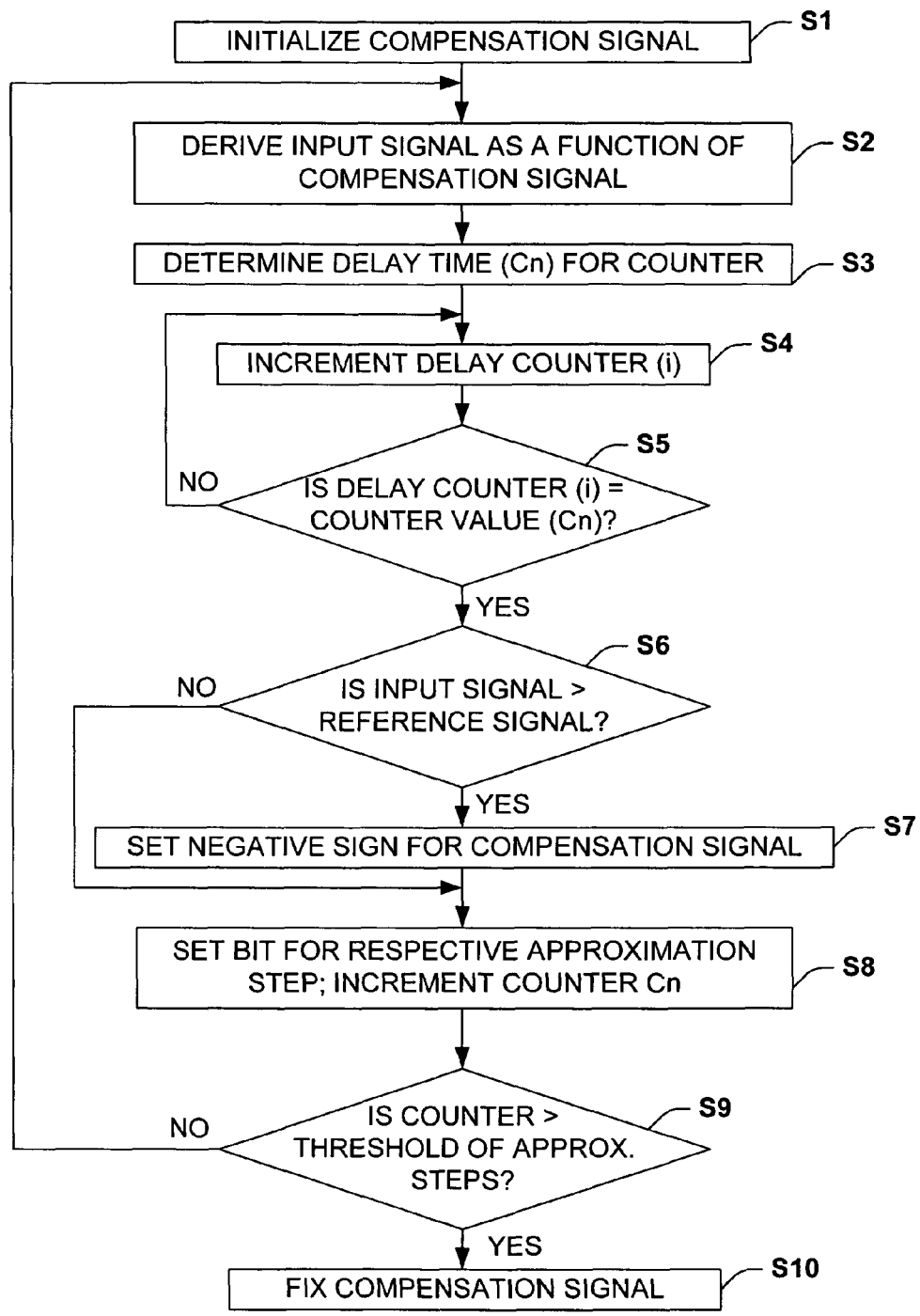
FIG. 5 is an exemplary flow chart diagram for an embodiment of a method for determination of an offset.

FIG. 5 shows an exemplary flow chart diagram of a method for determination of an offset. In this example, the method comprises M approximation steps. Although the methodology of FIG. 5 is illustrated and described hereinafter as a series of acts or events, it will be appreciated that the present invention is not limited by the illustrated ordering of such acts or events. For example, some acts may occur in different orders and/or concurrently with other acts or events apart from those illustrated and/or described herein. In addition, not all illustrated acts may be required to implement a methodology in accordance with one or more aspects of the present invention. Further, one or more of the acts may be carried out in one or more separate acts or phases.

In a first step S1, all bits $a_j$ of a compensation signal are initialized with a logical zero, wherein j takes values from 1 to M. An approximation step counter n is initialized to 1. In a second step S2, an input signal y is derived as a function of the compensation signal. A delay time $C_n$ is determined for the approximation step counter n, for example from the memory unit 132 at 53. The counter value n is, for example, comprised by the counter signal CS. A delay counter i is initialized to 1 in one embodiment.

In an alternative embodiment, the steps S2 and S3 can be interchanged.

In a step S4, the delay counter i is increased by 1 and in a step S5, it is determined whether the delay counter i equals the counter value $C_n$. If the delay counter i equals the counter value $C_n$, a predetermined period between approximation steps or from the beginning of the determination to the first approximation step has been reached. Otherwise, it is continued at step S4.

In step S6, the input signal y is compared to a reference value. In a first approximation step n=1 a sign of the desired compensation signal can be determined. If the input signal y is greater than the reference value, the offset to be determined is positive, otherwise it is negative. A negative sign can be set at step S7.

In step S8, the bit $a_n$ for the actual approximation step n is set to 1. The approximation step counter n is increased by 1.

For further approximation steps n>1, in step S6 the input signal is compared to the reference signal to determine whether the compensation signal is too high, resulting in an overcompensation. In this case, in step S7, the bit set in the last approximation step $B_{n-1}$ is reset to 0.

In step S9, it is tested whether the approximation step counter n is greater than the predetermined number M of approximation steps and it is either continued with step S2 for further approximation steps or with step S10, which fixes the determined compensation signal and ends the approximation. In an alternative embodiment, the sign of the offset can be determined in step S1. In this case, the first bit $a_{n=1}$ of the compensation signal is set to 1. If the compensation signal is determined as being too high in step S6, the actual bit an is reset in step S7. Accordingly, the next bit $B_{n+1}$ is set in step S8.

Figure 6:
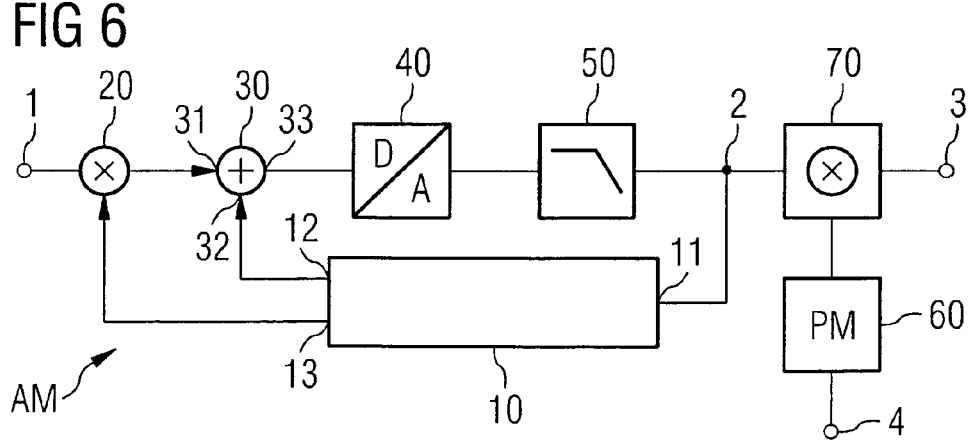
FIG. 6 is an exemplary embodiment of a polar modulator with an offset compensation arrangement.

FIG. 6 shows an embodiment of a polar modulator arrangement. An amplitude modulator arrangement AM comprises an offset compensation arrangement, for example as shown in the embodiment of FIG. 3. An amplitude word is provided at the signal input 1 and converted to an analog signal at a node 2. An offset resulting from the digital/analog converter 40 and the low-pass filter 50 is compensated for by a compensation signal provided by the offset determination arrangement 10. The node 2 forms an output of the amplitude modulator arrangement.

The polar modulator arrangement further comprises a phase modulator arrangement 60 and a mixer device 70 which on its input side is coupled to respective outputs of the amplitude modulator arrangement and the phase modulator arrangement 60.

To perform a polar modulation, a compensation signal is generated with the offset determination arrangement 10. An amplitude word is provided at the signal input 1. The compensation signal is added to the amplitude word. The result of the addition is converted to an analog signal.

A phase component is provided at the phase input 4 to the phase modulator arrangement 60 to generate a phase modulated carrier signal. The digital/analog converted signal at the output of the amplitude modulator arrangement is mixed with the phase modulated carrier signal in the mixer device 70 and provided as a radio frequency signal at a signal output 3.

Distortions of the output signal or an impairment of the signal quality can be reduced through the compensation signal which can be determined in a fast approximation process according to the present invention.

To determine the respective delay times to be used for the synchronization signal SYS an accuracy of the successive approximation algorithm and a step response s(t) of the low-pass filter may be considered in one embodiment. In each approximation step n of a successive approximation, comprising M steps, the following condition should be fulfilled for all times after performing the approximation step n:

$$\left| \sum_{i=1}^{n} a_i 2^{-i} s(t - t_{i-1}) - \sum_{i=1}^{n} a_i 2^{-i} \right| < 2^{-(M+1)} \quad (1)$$

with $$1 \le n \le M, t_0 = 0, a_i = \pm 1$$

The instants $t_n$ represents the respective time instants at which a respective n-th approximation step is performed. The instants relate to a beginning to of the approximation process. By equation (1) it should be ensured that the step response s(t) of the low-pass filter remains within the borders of accuracy of $2^{-(M+1)}$ for each of the M approximation steps. The factors $a_i$ represent the digital result of the algorithm. Without loss of generality they are assumed as all having the value 1, thus:

$$a_i := 1 \text{ with } 1 \le i \le M \quad (2)$$

By solving the absolute value from equation (1) the following two conditions can be derived:

$$\sum_{i=1}^{n} 2^{-i} s(t - t_{i-1}) - \sum_{i=1}^{n} 2^{-i} < \quad (3)$$

$$2^{-(M+1)} \vee \sum_{i=1}^{n} 2^{-i} s(t - t_{i-1}) - \sum_{i=1}^{n} 2^{-i} > -2^{-(M+1)}$$

By solving the geometric series which is formed by the sum of $2^{-i}$ equation (3) results in:

$$\sum_{i=1}^{n} 2^{-i} s(t - t_{i-1}) < \quad (4)$$

$$2^{-(M+1)} + 1 - 2^{-n} \vee \sum_{i=1}^{n} 2^{-i} s(t - t_{i-1}) > 2^{-(M+1)} + 1 - 2^{-n}$$

For a first approximation step (n=1) equation (4) simplifies to:

$$\sum_{i=1}^{1} 2^{-i}s(t) < 2^{-(M+1)} + 1 - 2^{-1} \vee \sum_{i=1}^{1} 2^{-i}s(t) > -2^{-(M+1)} + 1 - 2^{-1} \quad (5)$$

or, solved, $$s(t) < 1 + 2^{-M} \vee s(t) > 1 - 2^{-M} \quad (6)$$

It can be difficult to determine the instant $t_1$ from which equation (6) is fulfilled, especially if a step response s(t) shows a transient effect of a damped oscillation. Such behavior is usually the case for filters with a filter order greater than 1. For a low-pass filter of first order, the step response s(t) can be determined by:

$$s(t) = 1 - e^{-\omega_g t}, \quad (7)$$

wherein ωhd g is the cut-off frequency of the low-pass filter. In this case equation (6) is fulfilled for $$t > \frac{\ln 2 \cdot M}{\omega_g} =: t_1. \quad (8)$$

For step responses with local extrema, for example for higher filter orders, a solution of equation (6) can usually only be achieved numerically, because the step response comprises a non-linear function. For example a step response of a third order Butterworth filter can be defined by:

$$s(t) = 1 - e^{-\omega_g t} - \frac{2e^{-\omega_g t/2} \sin\left(\frac{1}{2}\sqrt{3}\,\omega_g t\right)}{\sqrt{3}} \quad (9)$$

An instant $t_1$ can be determined numerically, for example with a binary search or a bisection method.

A second approximation step (n=2) results from the transient response of the filter of the first approximation step and the transient response caused by the second bit $a_2$. According to equation (4), the following condition should be fulfilled:

$$2^{-1}s(t) + 2^{-2}s(t - t_1) <$$
$$2^{-(M+1)} + \frac{3}{4} \vee 2^{-1}s(t) + 2^{-2}s(t - t_1) > -2^{-(M+1)} + \frac{3}{4} \quad (10)$$

An instant $t_2$ can now be determined similarly as proposed for the first approximation step. If it is assumed that the first transient approximately has reached its final value at the new instant $t_2$ to be calculated, in other words, if $s(t_2)=1$, equation (10) results in:

$$s(t - t_1) < 2^{1-M} + 1 \vee s(t - t_1) > -2^{1-M} + 1 \quad (11)$$

For the special case of a low-pass filter of first order, an instant $t_2$ can be determined analytically by:

$$t > \frac{\ln 2 \cdot (2M - 1)}{\omega_g} =: t_2 \quad (12)$$

In other cases the instant $t_2$ usually has to be determined numerically. Further instants $t_n$ can be determined in a similar manner.

A time gain for using the above proposed solution in one embodiment can be determined analytically for a first order low-pass filter. With $$t_n = \frac{\ln 2}{\omega_g}\left(nM - \frac{(n-1)n}{2}\right) \quad (13)$$

being instants $t_n$ for a n-th approximation step according to equation (4), a total time $t_e$ for an approximation process according to the proposed principle can be derived from equation (13) by $$t_e = \frac{\ln 2}{\omega_g}\left[M \cdot M - \frac{M(M-M)}{2}\right] = \frac{\ln 2}{2\omega_g} M(M+1). \quad (14)$$

With a total time $t_c$ of a conventional successive approximation process of $$t_c = \frac{\ln 2}{\omega_g} M \cdot M \quad (15)$$

the time gain G results in $$G = \frac{t_c}{t_e} = 2\frac{M}{M+1} \quad (16)$$

which results in a value of approximately 2 for medium to large numbers M of approximation steps. For example, the time gain G for M=8 is G=1.78 and for M=12 is G=1.85. Similar results for the time gain G can be achieved for higher order low-pass filters and a numerical solution.

Although specific embodiments have been illustrated and described herein, it will be appreciated by those of ordinary skill in the art, that any arrangement which is calculated to achieve the same purpose may be substituted for the specific embodiments shown. It is to be understood, that the above description is intended to be illustrative and not restrictive. This application is intended to cover any adaptations or variations of the invention. Combinations of the above embodiments and many other embodiments will be apparent to those of skill in the art upon reading and understanding the above description. The scope of the invention includes any other embodiments and applications in which the above structures and methods may be used. The scope of the invention should, therefore, be determined with reference to the appended claims along with the scope of equivalents to which such claims are entitled.

It is emphasized that the Abstract is provided to comply with 37 C.F.R. section 1.72(b) requiring an abstract that will allow the reader to quickly ascertain the nature and gist of the technical disclosure. It is submitted with the understanding, that it will not be used to interpret or limit the scope or meaning of the claims.

The invention claimed is:

1. An offset determination arrangement, comprising:
   a comparator device configured to compare an input signal with a reference value;
   a synchronization unit configured to forward a comparison result of the comparator device as a function of a synchronization signal;
   a synchronization clock generator configured to generate the synchronization signal based upon a reference clock signal, wherein the synchronization signal comprises clock pulses and wherein at least one subsequent clock period is shorter than a precedent clock period; and
   an approximation unit configured to generate a compensation signal corresponding to an offset of the input signal as a function of the forwarded comparison result.

2. The offset determination arrangement of claim 1, wherein the synchronization clock generator is configured to generate the synchronization signal as a function of a reference clock signal.

3. The offset determination arrangement of claim 1, wherein the synchronization clock generator is configured to generate the synchronization signal with a predetermined number of clock pulses or clock periods.

4. The offset determination arrangement of claim 1, wherein the synchronization clock generator is configured to generate the synchronization signal with each of a second and further clock periods being shorter than a precedent clock period.

5. The offset determination arrangement of claim 1, wherein the synchronization clock generator and the approximation unit each comprise a control input configured to receive a control signal corresponding to a beginning of an offset determination.

6. The offset determination arrangement of claim 1, wherein the approximation unit is configured to generate the compensation signal using a method of successive approximation.

7. The offset determination arrangement of claim 1, wherein the synchronization clock generator comprises:
   a control unit configured to generate a counter signal comprising a counter value;
   a memory unit configured to receive the counter signal and to determine a delay time corresponding to the counter value, wherein at least one delay time corresponding to one of the counter values is shorter than a delay time corresponding to a respective precedent counter value; and
   a programmable counter configured to count a number of clock pulses and to output a clock pulse in the synchronization signal when the number of clock pulses equal to the delay time.

8. An offset compensation arrangement, comprising:
   a signal input;
   a summation element with a first input coupled to the signal input, a second input coupled to an output of a feedback path, and an output;
   a forward path coupled to the output of the summation element, and comprising a digital-analog-converter;
   a signal output coupled to an output of the forward path; and
   the feedback path coupled to the output of the forward path, and comprising an offset determination arrangement configured to generate a compensation signal at the output of the feedback path corresponding to an offset of an input signal at the output of the forward path, wherein the offset determination arrangement uses a method of successive approximation over a plurality of approximation steps respectively comprising a clock pulse of a synchronization signal that is based upon a reference clock signal, wherein at least one period between the approximation steps is shorter than a precedent period between the approximation steps.

9. The offset compensation arrangement of claim 8, further comprising a switching element coupled between the signal input and the first input of the summation element, wherein the switching element is controlled by the offset determination arrangement.

10. The offset compensation arrangement of claim 8, wherein the forward path further comprises a low-pass filter coupled between an output of the digital-analog-converter and the signal output.

11. The offset compensation arrangement of claim 8, wherein the offset determination arrangement is configured to use a method of successive approximation in which each of a second and further periods between approximation steps is shorter than a precedent period between approximation steps.

12. The offset compensation arrangement of claim 8, wherein the offset determination arrangement comprises:
   a comparator device configured to compare the input signal with a reference value;
   a synchronization unit configured to forward a comparison result of the comparator device as a function of clock pulses of a synchronization signal;
   an approximation unit configured to generate the compensation signal as a function of the forwarded comparison result; and
   a synchronization clock generator configured to generate the synchronization signal, wherein at least one clock period between adjacent clock pulses is shorter than a precedent clock period.

13. The offset compensation arrangement of claim 12, wherein the synchronization clock generator is configured to generate the synchronization signal as a function of a reference clock signal.

14. The offset compensation arrangement of claim 12, wherein the synchronization clock generator is configured to generate the synchronization signal for a predetermined number of approximation steps.

15. The offset compensation arrangement of claim 12, wherein the synchronization clock generator and the approximation unit each comprise a control input configured to receive a control signal corresponding to a beginning of an offset determination.

16. A modulation method, performed in a modulation arrangement having an amplitude path with an offset compensation arrangement which comprises a summation element coupled to an output of a feedback path, a forward path which on its input side is coupled to an output of the summation element, and the feedback path which on its input side is coupled to an output of the forward path and comprises an offset determination arrangement to generate a compensation signal corresponding to an offset of an input signal at the output of the forward path, wherein the offset determination arrangement uses a method of successive approximation in which at least one period between approximation steps is shorter than a precedent period between approximation steps, the modulation method comprising:

generating the compensation signal with the offset determination arrangement, wherein the compensation signal is approximated over a plurality of approximation steps respectively comprising a clock pulse of a synchronization signal that is based upon a reference clock signal;

providing an amplitude word;

adding the compensation signal to the amplitude word;

performing a digital-analog conversion of the addition result; and frequency mixing the digital-analog converted signal with a carrier signal.

17. The modulation method of claim 16, wherein the carrier signal comprises a phase modulated carrier signal.

\* \* \* \* \*